United States Patent
Obi et al.

(10) Patent No.: US 8,044,632 B2
(45) Date of Patent: Oct. 25, 2011

(54) POWER CONVERSION DEVICE

(75) Inventors: Hideo Obi, Chiyoda-ku (JP); Takahiro Kikuchi, Chiyoda-ku (JP); Takeshi Tanaka, Chiyoda-ku (JP); Daisuke Ito, Chiyoda-ku (JP); Keita Hatanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 483 days.

(21) Appl. No.: 12/376,464

(22) PCT Filed: Oct. 19, 2006

(86) PCT No.: PCT/JP2006/320807
§ 371 (c)(1),
(2), (4) Date: Feb. 5, 2009

(87) PCT Pub. No.: WO2008/047430
PCT Pub. Date: Apr. 24, 2008

(65) Prior Publication Data
US 2010/0231159 A1    Sep. 16, 2010

(51) Int. Cl.
*H02P 27/04*    (2006.01)
(52) U.S. Cl. ......... 318/801; 318/811; 318/802; 318/803
(58) Field of Classification Search .................. 318/801
See application file for complete search history.

(56) References Cited

U.S. PATENT DOCUMENTS

| | | | |
|---|---|---|---|
| 4,066,938 A * | 1/1978 | Turnbull | 318/803 |
| 4,602,701 A * | 7/1986 | Tanahashi | 187/296 |
| 4,780,650 A * | 10/1988 | Miyazaki et al. | 318/71 |
| 5,250,890 A | 10/1993 | Tanamachi et al. | |
| 6,307,759 B1 | 10/2001 | Inarida et al. | |
| 7,855,526 B2 * | 12/2010 | Ohnishi et al. | 318/800 |

FOREIGN PATENT DOCUMENTS

| | | | |
|---|---|---|---|
| CN | 85 1 01195 | | 9/1986 |
| CN | 1265784 A | * | 9/2000 |
| JP | 06237544 A | * | 8/1994 |

(Continued)

OTHER PUBLICATIONS

International Search Report for PCT/JP2006/320807, completed Dec. 25, 2006.

(Continued)

*Primary Examiner* — Bentsu Ro
*Assistant Examiner* — Jorge Carrasquillo
(74) *Attorney, Agent, or Firm* — Buchanan Ingersoll & Rooney PC

(57) ABSTRACT

A power conversion device includes a converter that converts AC power to DC power, a converter controller that controls an output voltage of the converter, an inverter that converts the DC power to AC power at a variable frequency, an inverter controller that controls an output frequency of the inverter, and a current detector that detects an AC current on an input side of the converter. It is configured in such a manner that the inverter controller adjusts a slip frequency of the induction motor in response to a fluctuation of the AC current on the input side of the converter detected by the current detector. It thus becomes possible to suppress a beat current in an output current of the inverter at the occurrence of a load fluctuation as well as a power supply voltage fluctuation.

3 Claims, 5 Drawing Sheets

FOREIGN PATENT DOCUMENTS

| | | |
|---|---|---|
| JP | 7-046918 B | 5/1995 |
| JP | 10-150796 A | 6/1998 |
| JP | 10150796 A * | 6/1998 |
| JP | 11-262285 A | 9/1999 |
| JP | 2002-095261 A | 3/2002 |
| JP | 2003-250300 A | 9/2003 |

OTHER PUBLICATIONS

Office Action dated Sep. 14, 2010, issued in the corresponding Chinese Patent Application No. 200680056088.2.

* cited by examiner

POWER CONVERSION DEVICE

TECHNICAL FIELD

The present invention relates to a power conversion device, and more particularly, to a power conversion device that drives an induction motor by converting AC power to DC power using a converter and by further converting the DC power to AC power using an inverter.

BACKGROUND ART

A power conversion device in the related art according to Patent Document 1 detects a pulse on the DC side of an inverter resulting from rectification by a converter and controls an output frequency of the inverter using frequency control means. The power conversion device suppresses a beat phenomenon of the inverter resulting from a pulse component (rectification ripple of the converter) included in a DC input voltage of the inverter (pulse correction operation).

The device in Patent Document 1 is to control an output frequency of the inverter by detecting a pulse (change) of the output voltage of the converter (DC input voltage of the inverter). The output voltage of the converter, however, hardly changes in response to a load fluctuation of another vehicle occurring on wiring and a speed variance (load fluctuation) of an induction motor in the own vehicle. The device therefore has a problem that it fails to enables the pulse correction operation described above promptly.

Patent Document 1: JP-B-7-46918

DISCLOSURE OF THE INVENTION

Problems that the Invention is to Solve

The invention was devised in view of the problems discussed above and provides a voltage conversion device that not only enables a pulse correction operation promptly for a pulse caused by a load fluctuation but also performs the pulse correction operation for a pulse resulting from the power supply side.

Means for Solving the Problems

A voltage conversion device of the invention is a power conversion device that converts AC power from an AC power supply to AC power at a variable frequency to be supplied to an induction motor, which includes: a converter that converts AC power from an AC power supply to DC power; a converter controller that controls an output voltage of the converter; an inverter that converts the DC power to AC power at a variable frequency; an inverter controller that controls an output frequency of the inverter; and a current detector that detects an AC current on an input side of the converter. It is configured in such a manner that the inverter controller adjusts a slip frequency in response to a fluctuation of the AC current on the input side of the converter detected by the current detector.

ADVANTAGES OF THE INVENTION

The voltage conversion device of the invention is configured in such a manner that the inverter controller adjusts a slip frequency in response to a fluctuation of an AC current on the input side of the converter. Hence, not only is it possible to enable a pulse correction operation promptly for a pulse caused by a load fluctuation, but it is also possible to perform the pulse correction operation for a pulse resulting from the power supply side.

The above and other objects, features, perspectives, and advantages of the invention will become more apparent from the following detailed description of the invention with reference to the accompanying drawings.

Description of Reference Numerals and Signs

| | |
|---|---|
| 1: AC wiring | 2: pantograph |
| 3: transformer | 4: converter |
| 5: inverter | 6: induction motor |
| 7: filter capacitor | 8: converter controller |
| 9: inverter controller | 10: primary side of transformer |
| 11: current detector | 12: rotational frequency detector |
| 13: current detector | |
| 21: DC voltage command | 22: DC voltage |
| 23: band elimination filter | 24: subtractor |
| 25: voltage controller | 26: transformer primary voltage |
| 27: phase detector | 28: reference sine wave data |
| 29: multiplier | 30: AC current |
| 31: subtractor | 32: current controller |
| 33: secondary side converted value | 34: adder |
| 35: divider | 36: PWM circuit |
| 41: band pass filter | 42: band elimination filter |
| 43: multiplier | 44: BPF |
| 45: gain table | 46: multiplier |
| 47: ring buffer | 48: frequency correction |
| 51: rotational frequency | 52: torque command |
| 53: slip frequency command generator | 54: adder |
| 55: divider | 56: PWM circuit |
| 57: adder | 58: induction motor current |
| 100: power conversion device | |

BEST MODE FOR CARRYING OUT THE INVENTION

First Embodiment

Figure 1:
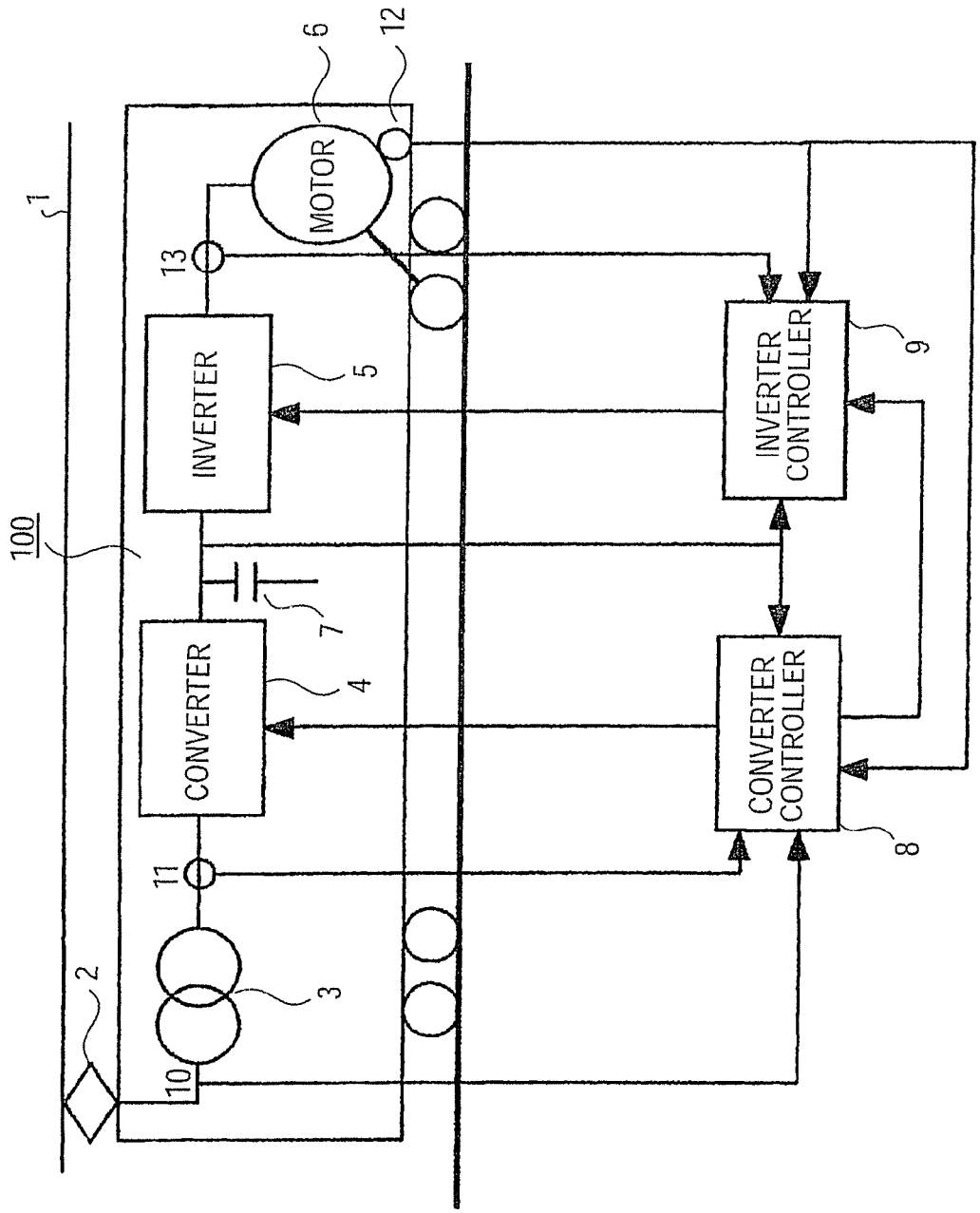
FIG. 1 is a view showing the configuration of a power conversion device according to a first embodiment of the invention.

FIG. 1 is a view showing the configuration of a power conversion device according to a first embodiment of the invention. A power conversion device 100 is mounted on a vehicle and it is supplied with AC power from an AC wiring 1 via a pantograph 2. The AC power is stepped down to a suitable AC voltage by a transformer 3 and converted to DC power by a converter 4, after which the DC power is further converted to AC power at a variable frequency by an inverter 5 for driving an induction motor 6. Numeral 7 denotes a filter capacitor that smoothens a DC voltage, which is an output of the converter 4.

Into a converter controller 8 are inputted a transformer primary voltage on a primary side 10 of the transformer 3, a DC voltage of the capacitor 7 as an output voltage of the converter 4, an AC current on a secondary side of the transformer 3, that is, on the input side of the converter 4, detected by a current detector 11, and a rotational frequency of the induction motor 6, and from the converter controller 8 are outputted a control command to the converter 4 and a frequency correction amount to an inverter controller 9. Into the inverter controller 9 are inputted a rotational frequency of the induction motor 6, a DC voltage of the capacitor 7, a current of the induction motor 6 detected by a current detector 13, and a frequency correction amount from the converter 4, and from the inverter controller 9 is outputted a control command to the inverter 5.

Figure 2:
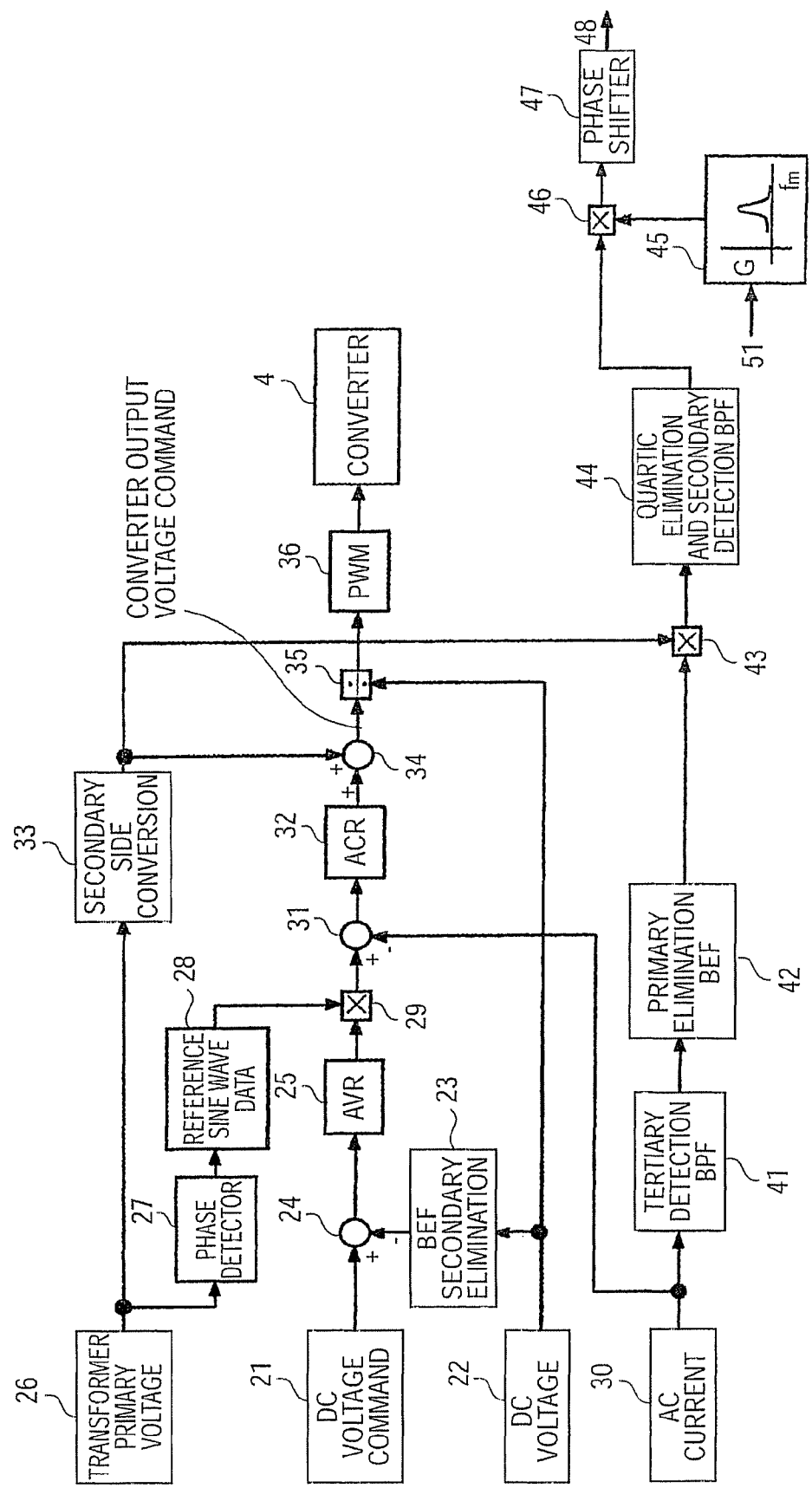
FIG. 2 is a control block diagram showing a converter controller of the first embodiment.

Operations will now be described. The converter 4 obtains a DC voltage by rectifying an AC voltage. FIG. 2 is a control block diagram showing the converter controller 8 of the first embodiment. Numeral 21 denotes a DC voltage command to the converter 4. Numeral 22 denotes a DC voltage of the capacitor 7. Numeral 23 denotes a band elimination filter (abbreviated as BEF) and it eliminates a component twice the power supply frequency (50 Hz or 60 Hz) from the DC voltage 22 and outputs the result. A subtractor 24 subtracts an output of the BEF 23 from the DC voltage command 21 and inputs the result to a voltage controller 25 that issues a current command to make the DC voltage constant.

A phase detector 27 detects the phase of a voltage using a primary voltage 26 of the transformer 3 and generates a sine wave in sync with the primary voltage 26 from sine wave data 28 set as the reference. An AC current command is then obtained by multiplying the sine wave by an output of the voltage controller 25 in a multiplier 29. An AC current 30 detected by the current detector 11 is subtracted from the AC current command in a subtractor 31. An output of the subtractor 31 is inputted into a current controller 32. Subsequently, an output of the current controller 32 that controls the current to be a current specified by a command and a value 33 found by converting an AC primary voltage of the transformer 3 to a secondary side are added in an adder 34. A converter output voltage command is thus obtained.

The converter voltage command is divided by the DC voltage 22 using a divider 35 to correct a fluctuation of the DC voltage. The output is then inputted into a PWM circuit 36 and the respective semiconductor devices in the converter 4 are driven by the PWM circuit 36. When configured in this manner, it becomes possible to control a DC voltage on the output side of the converter 4 to be constant while controlling the power factor on the power supply side to be 1.

Regarding a load fluctuation of another vehicle occurring on the wiring and a speed variance (load fluctuation) of the induction motor and a power supply fluctuation in the own vehicle, in a case where a pulse frequency resulting from these fluctuations coincides with a rotational frequency (inverter output frequency) of the induction motor connected to the inverter, a pulse component is amplified, which consequently gives rise to a beat in an induction motor current and may possibly result in an overcurrent stop. To overcome this inconvenience, in a case where the both frequencies coincide with each other, a slip frequency of the induction motor is operated in order to suppress the amplification of the pulse component for suppressing the generation of a beat component. The coinciding frequency at which the beat is generated is known to be a double component of the converter AC voltage (power supply) frequency. Accordingly, given that the power supply frequency is 50 Hz or 60 Hz, then the beat generating frequency is 100 Hz or 120 Hz.

A beat component is generated in the AC side current of the converter at the beginning in response to a load fluctuation and a power supply fluctuation. Hence, an AC current of the converter is detected for the beat suppression control. A manner to extract the beat component from the AC current of the converter will now be described with reference to FIG. 2. Because the is twice the power supply-voltage frequency of the converter 4, a single component and a triple component of the frequency are generated in an AC current 30 of the converter 4. Herein, because the single component is indistinguishable from the original AC current component, the triple component alone is extracted using a band pass filter (abbreviated as BPF) 41. In this instance, it is preferable to set a suitable gain so as to increase the accuracy of the detection value. Because the single component remains after the passing of the BPF 41 that extracts the triple component, the single component is cut using a band elimination filter (abbreviated as BEF) 42.

In order to suppress the beat, it is necessary to convert the triple component extracted as described above to a frequency that acts on the rotational frequency of the induction motor, which requires a conversion to a double component. To this end, a double component and a quadruple component of the frequency of the AC current 30 are extracted by multiplying the triple component extracted at the BEF 42 by the value 33 converted to the secondary side in a multiplier 43. These components are allowed to pass through the BPF 44 which extracts the double component that contributes to a beat. Further, for this value to act only on the frequency at which the beat needs to be suppressed, this value is multiplied in a multiplier 46 using a gain table 45 (a table having values only in the vicinity of the double component of the rotational frequency of the induction motor and 0 gain at the other frequencies) that uses the abscissa for a rotational frequency fm of the induction motor (a rotational frequency 51 obtained by the rotation frequency detector 12) and the ordinate for a gain G. A phase shift is performed for matching the timing to enable an output of the multiplier 46 to suppress a beat in the induction motor current. To this end, a ring buffer (phase shifter) 47 is provided, so that the phase is shifted to cause a delay in achieving the maximum suppressing effect. A beat correction amount (frequency correction amount) 48 is thus obtained. A phase shifting amount in the ring buffer 47 is a value about 0.5° before one cycle of the frequency twice the rotational frequency of the induction motor.

Figure 3:
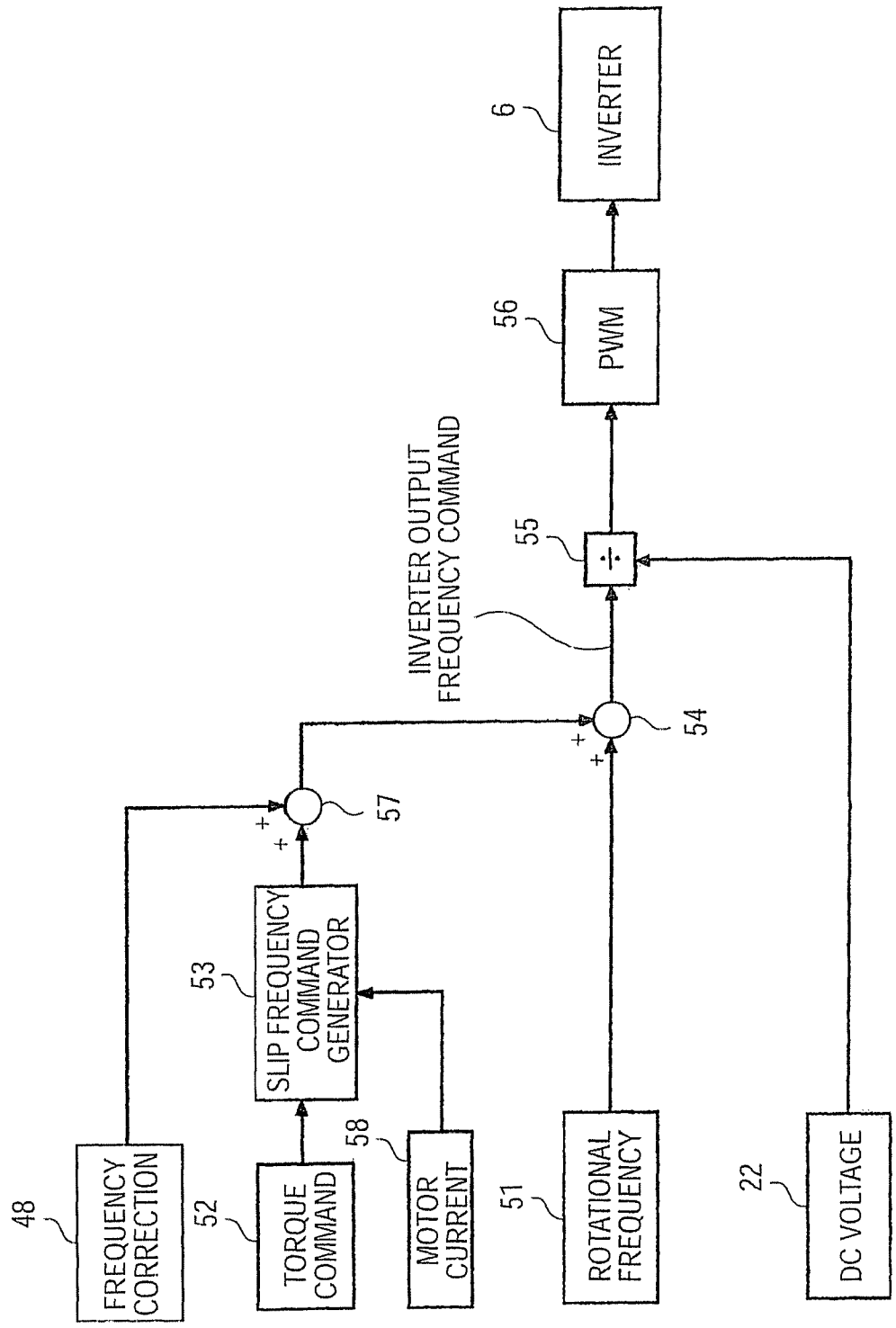
FIG. 3 is a control block diagram showing an inverter controller of the first embodiment.

FIG. 3 is a control block, diagram showing the inverter controller 9 of the first embodiment. The inverter 5 side performs the slip frequency control. A slip frequency command outputted by inputting a torque command 52 and an induction motor current 58 into a slip frequency command generator 53 and the rotational frequency 51 obtained by the rotational frequency detector 12 are added in an adder 54 to obtain an inverter output frequency command. The inverter output frequency command is divided by the DC voltage 22 using a divider 55 to correct a variance of the DC voltage. The resulting output is then inputted into a PWM circuit 56. The induction motor 6 is driven by driving the respective semiconductor devices in the inverter 5 using the PWM circuit 56.

In this instance, a frequency correction amount (beat correction amount) 48 obtained in the converter controller 8 is added to the slip frequency command of the inverter in an adder 57 and the added output is inputted into the adder 54. Consequently, not only can a fluctuation of AC power of the converter 5 be suppressed, but also a current fluctuation (beat) of the induction motor can be suppressed.

As has been described, a beat component is not superimposed on an induction motor current outputted from the inverter that is controlled by an inverter output frequency command taking beat suppression into account. A beat amplification phenomenon resulting from a load fluctuation and a power supply fluctuation can be therefore eliminated and hence an overcurrent in the induction motor current can be avoided.

Figure 4:
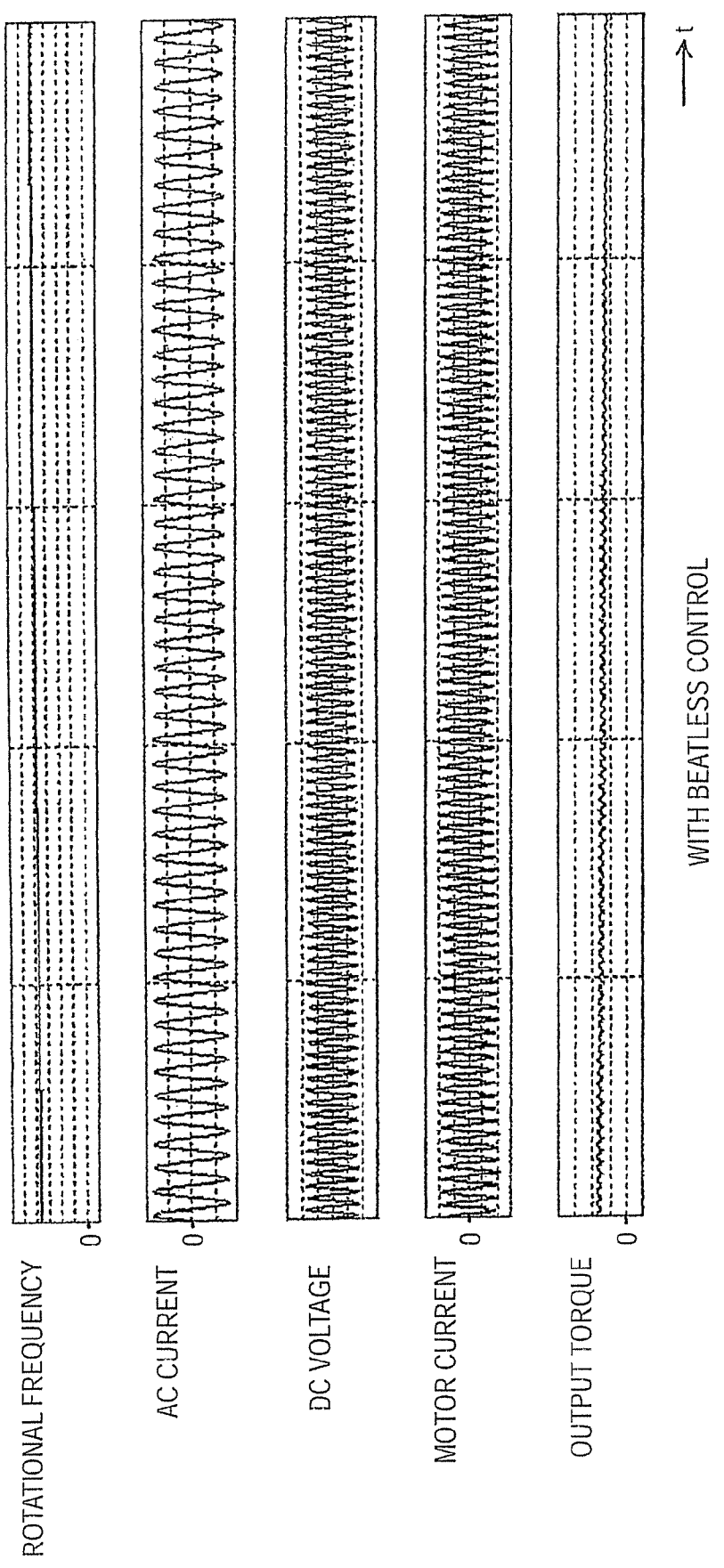
FIG. 4 is a waveform chart when beatless control of the first embodiment is applied.
Figure 5:
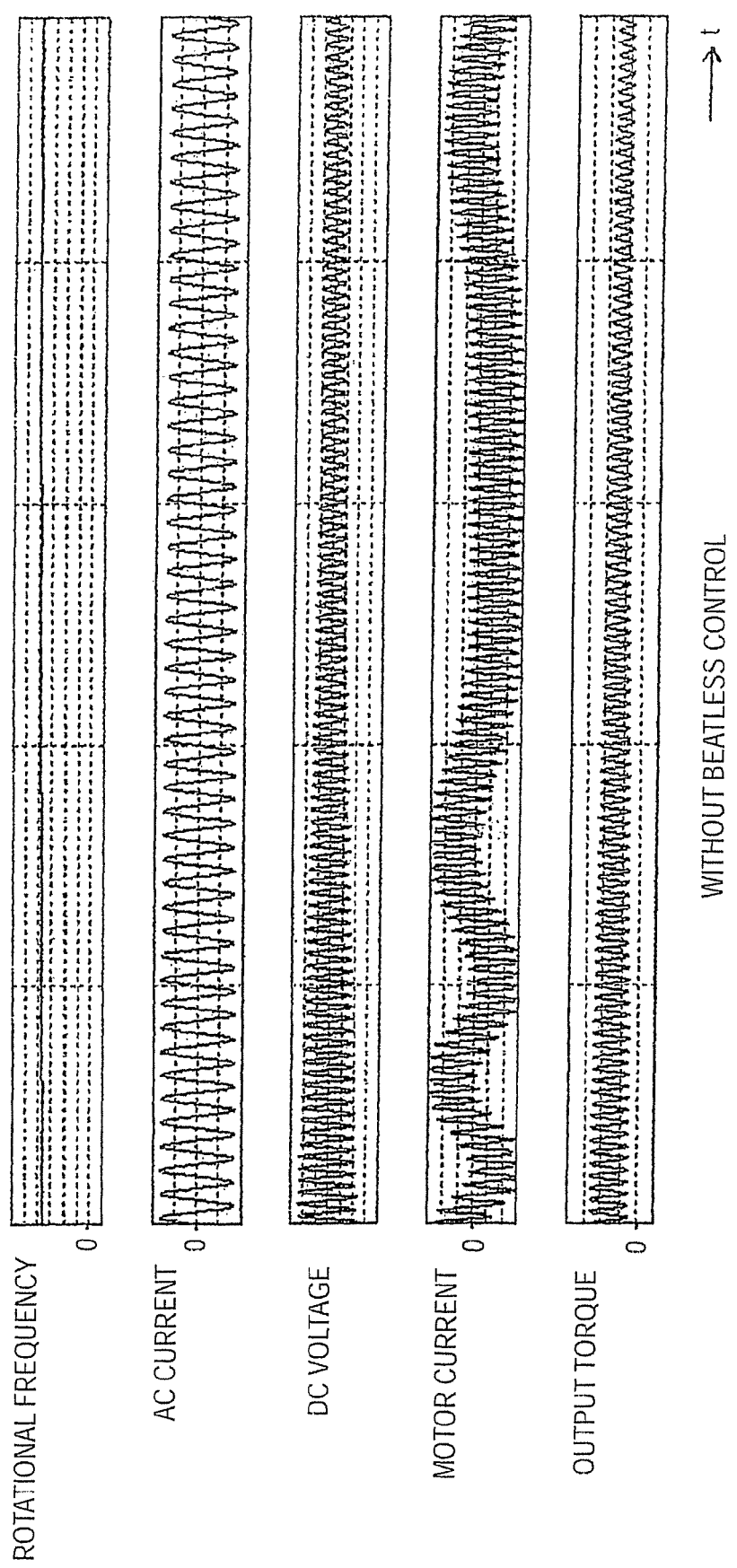
FIG. 5 is a waveform chart when the beatless control is not applied.

The results of simulation conducted using the first embodiment are set forth in FIG. 4 and FIG. 5. FIG. 4 is a waveform chart when beatless control of the first embodiment is applied. FIG. 5 is a waveform chart when the beatless control is not applied. FIG. 4 and FIG. 5 show waveforms of a rotational frequency of the induction motor 6, an AC current on the input side of the converter 4, a DC voltage of the capacitor 7, a current and output torque of the induction motor 6 with respect to a time t on the abscissa. It is understood that in comparison with the case of FIG. 5 where the heatless control is not applied, it is apparent that a beat in the induction motor current is suppressed and a fluctuation of the DC voltage is also suppressed in the case of FIG. 4 where the beatless control is applied.

A case where the invention is applied to an AC trolley car has been described above by way of example. It should be appreciated, however, that the invention is also applicable to other fields of machine tools and fan pumps that drive an induction motor by means of a three-phase AC output inverter using a single phase AC power supply as an input.

Various modifications and alterations of the invention are feasible by anyone skilled in the art without deviating from the scope and sprit of the invention and it should be understood that the invention is not limited to the embodiment described in the specification.

The invention claimed is:

1. A power conversion device that converts AC power from an AC power supply to AC power at a variable frequency to be supplied to an induction motor, characterized by comprising:

a converter that converts AC power from an AC power supply to DC power;

a converter controller that controls an output voltage of the converter;

an inverter that converts the DC power to AC power at a variable frequency;

an inverter controller that controls an output frequency of the inverter; and a current detector that detects an AC current on an input side of the converter, wherein the inverter controller adjusts a slip frequency in response to a fluctuation of the AC current on the input side of the converter detected by the current detector.

2. The power conversion device according to claim 1, wherein:

the inverter controller includes a slip frequency command generator, and adjusts the slip frequency by adding a frequency correction amount corresponding to the fluctuation of the AC current on the input side of the converter detected by the current detector to a slip frequency command outputted from the slip frequency command generator.

3. The power conversion device according to claim 2, wherein:

the inverter controller finds the frequency correction amount is obtained depending on an amount of a component in the vicinity of three times a frequency of the AC power supply extracted from the AC current on the input side of the converter detected by the current detector.

* * * * *